(12) United States Patent
Kumar et al.

(10) Patent No.: US 9,246,797 B2
(45) Date of Patent: Jan. 26, 2016

(54) PORT BASED REDUNDANT LINK PROTECTION

(71) Applicant: Cisco Technology, Inc., San Jose, CA (US)

(72) Inventors: Nagendra Kumar, Bangalore (IN); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 13/764,030

(22) Filed: Feb. 11, 2013

(65) Prior Publication Data

US 2014/0226464 A1    Aug. 14, 2014

(51) Int. Cl.
*H04J 3/26* (2006.01)
*G06F 15/16* (2006.01)
*H04L 12/703* (2013.01)
*H04L 12/761* (2013.01)
*H04L 12/707* (2013.01)

(52) U.S. Cl.
CPC ............... *H04L 45/28* (2013.01); *H04L 45/16* (2013.01); *H04L 45/22* (2013.01)

(58) Field of Classification Search
None
See application file for complete search history.

(56) References Cited

U.S. PATENT DOCUMENTS

| 7,684,316 | B2 * | 3/2010 | Filsfils et al. | 370/222 |
|---|---|---|---|---|
| 7,953,027 | B2 * | 5/2011 | Previdi et al. | 370/256 |
| 8,068,481 | B2 * | 11/2011 | Boers et al. | 370/370 |
| 8,837,479 | B1 * | 9/2014 | Kumar et al. | 370/390 |
| 2013/0003732 | A1 * | 1/2013 | Dholakia et al. | 370/390 |
| 2013/0064245 | A1 * | 3/2013 | Wei et al. | 370/390 |

* cited by examiner

*Primary Examiner* — Edan Orgad
*Assistant Examiner* — Sithu Ko
(74) *Attorney, Agent, or Firm* — Campbell Stephenson LLP

(57) ABSTRACT

The present disclosure provides for avoiding packet loss and delay that occurs during conventional link switchover by moving link switchover logic from a downstream PORT (Protocol Independent Multicast Over Reliable Transport) routing element to an upstream PORT routing element. An upstream PORT routing element detects the failure of a forwarding interface for a multicast datastream, where the forwarding interface is coupled to a downstream PORT routing element. In response to detecting the failure, the upstream PORT routing element determines a set of candidate interfaces that are also coupled to the downstream PORT routing element. The upstream PORT routing element selects a new interface from the set of candidate interfaces and installs the new interface as a replacement forwarding interface for the multicast datastream.

23 Claims, 9 Drawing Sheets

PORT BASED REDUNDANT LINK PROTECTION

TECHNICAL FIELD

The present disclosure relates generally to Internet multicast protocols and, more particularly, to a PORT-based link switchover scheme that avoids packet loss and delay that occurs during conventional link switchover.

BACKGROUND

Multicast is often the preferred method of communication for many common network distribution applications. This is so because multicast is a bandwidth-conserving technology that reduces traffic by simultaneously delivering data to multiple hosts, or receivers. Once receivers have joined a multicast group, a server or source responsible for sending content need only send the content to the multicast group address, rather than sending the content to each individual receiver or to all receivers on the network.

BRIEF DESCRIPTION OF THE DRAWINGS

A more complete understanding of the present disclosure may be acquired by referring to the following description and accompanying drawings, in which like references numbers indicate like features.

Figure 1:
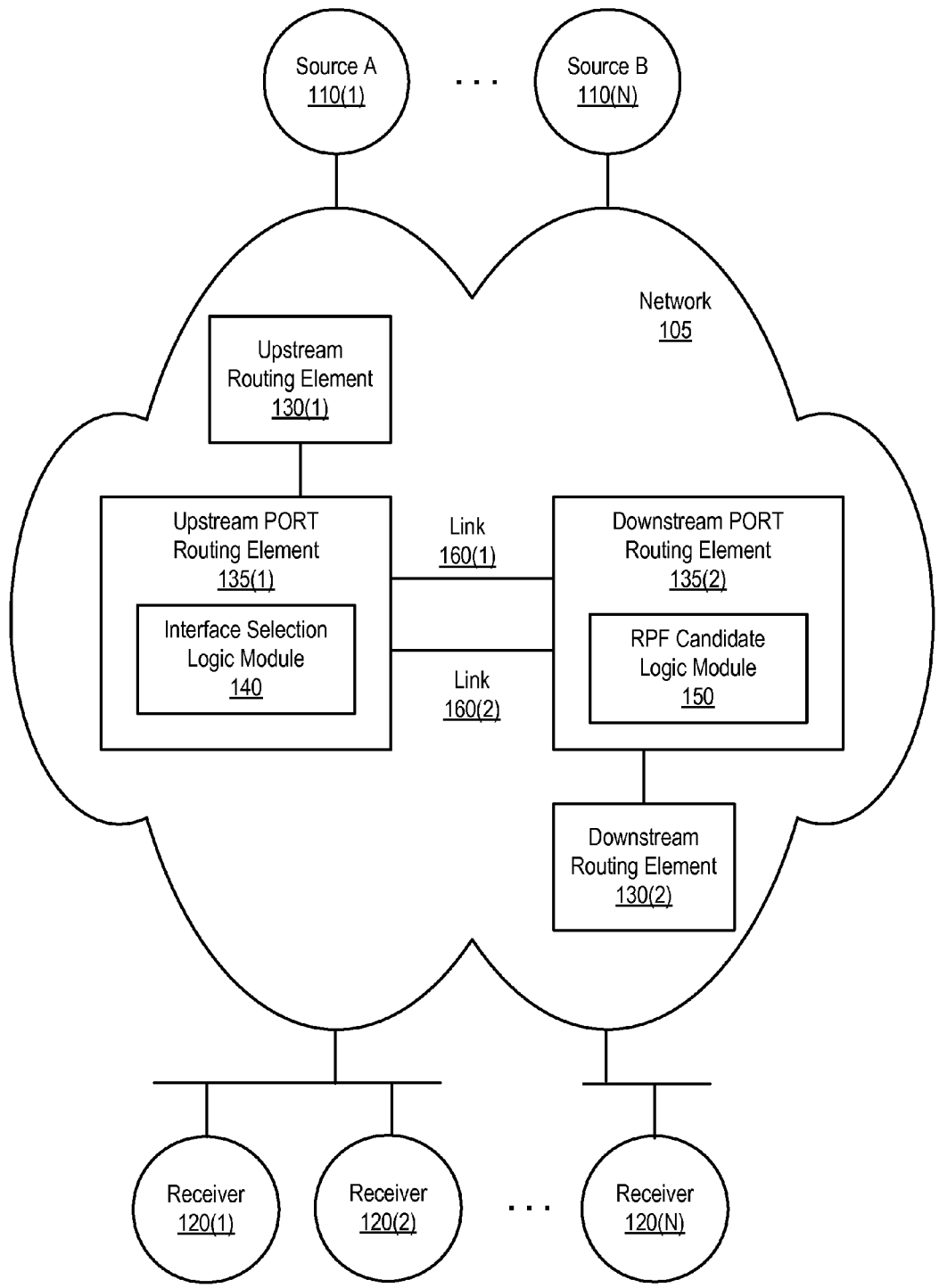
FIG. 1 is a block diagram illustrating components of an example network in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

The present disclosure provides for avoiding packet loss and delay that occurs during conventional link switchover by moving link switchover logic from a downstream PORT (Protocol Independent Multicast Over Reliable Transport) routing element to an upstream PORT routing element. An upstream PORT routing element detects the failure of a forwarding interface for a multicast datastream, where the forwarding interface is coupled to a downstream PORT routing element. In response to detecting the failure, the upstream PORT routing element determines a set of candidate interfaces that are also coupled to the downstream PORT routing element. The upstream PORT routing element selects a new interface from the set of candidate interfaces and installs the new interface as a replacement forwarding interface for the multicast datastream.

Example Embodiments

FIG. 1 is a block diagram illustrating components of an example network 105 in which the present disclosure can be implemented. Network 105 is configured to support IP (Internet Protocol) multicast and communicatively couples multicast sources 110(1)-(N), receivers 120(1)-(N), routing elements 130(1) and 130(2), and PORT-enabled routing elements 135(1) and 135(2). Multicast sources 110(1)-(N) are communicatively coupled to receivers 120(1)-(N) via routing elements 130(1)-(2) and PORT-enabled routing elements 135(1)-(2). In the embodiment shown, routing element 130(1) is communicatively coupled to PORT-enabled routing element 135(1), and routing element 130(2) is communicatively coupled to PORT-enabled routing element 135(2). PORT-enabled routing elements 135(1) and 135(2) are communicatively coupled via two links 160(1) and 160(2), but more than two links can be implemented between PORT-enabled routing elements 135(1) and (2). Each component is discussed in further detail below.

Multicast source A 110(1) and source B 110(N) each provide a different datastream, or content that is distributed as multicast packets, to one or more multicast groups. Other sources 110 in the network can provide duplicate datastreams to one or more multicast groups as anycast sources. Sources 110(1)-(N) can each be identified by a source address, such as an IP (Internet Protocol) address. Each multicast group can be identified by a multicast group address, such as an IP address. Each multicast group can include one or more receivers 120(1)-(N) that are subscribed to the multicast group to receive the content. Sources 110(1)-(N) and receivers 120(1)-(N) can be implemented using, for example, a desktop computer, a laptop computer, a workstation, a server, or the like.

Routing elements 130(1)-(2) and PORT routing elements 135(1)-(2) are representative of routing elements located within network 105. Routing elements 130(1)-(2) implement PIM (Protocol-Independent Multicast) multicast routing protocol, and can optionally implement PORT (PIM Over Reliable Transport) multicast routing protocol. PORT routing elements 135(1)-(2) implement both PIM multicast routing protocol and PORT multicast routing protocol, and thus are capable of communicating with both PIM-implementing routing elements and PORT-implementing routing elements.

Routing elements that implement PIM multicast routing protocol (also referred to herein as PIM routing elements) send and accept PIM join/prune messages from one another to perform tree maintenance. For example, in response to receiving a join message that requests a particular datastream, a PIM routing element builds a multicast tree, or branch thereof, for the datastream by consulting routing information maintained by a unicast routing protocol (such as Interior Gateway Protocol (IGP)) configured on the PIM routing element. The PIM routing element selects an interface that leads toward a content provider of the datastream (e.g., a multicast source or a rendezvous point routing element). The PIM routing element forwards the join message on the selected interface, which is coupled to an upstream PIM routing element. Receipt of the join message on the selected interface indicates to the upstream PIM routing element that the datastream requested in the join message should be forwarded to the (downstream) PIM routing element via the selected interface. In other words, the downstream PIM routing element conventionally selects the forwarding interface for the requested datastream.

In the event of failure of the forwarding interface, the downstream PIM routing element waits for its routing information to converge before trying to repair the multicast tree, or branch thereof (e.g., IGP convergence, where IGP routing protocol updates the PIM routing element's routing information to reflect the current path(s) to the content provider, taking the interface failure into account). Once convergence is complete, the downstream PIM routing element selects another upstream interface toward the content provider and transmits a PIM join message for the datastream on the selected interface, which will become the new forwarding interface for the datastream. Packet loss occurs during this downtime (e.g., packets continue to be transmitted downstream on the failed forwarding interface) until the multicast tree is rebuilt and packets are forwarded on the new forwarding interface. This downtime occurs even if the downstream PIM routing element is coupled to the upstream PIM routing element via a second active link (such as an ECMP (equal cost multi-path) link), which is eventually selected as the new forwarding interface. In other words, the downstream PIM routing element also conventionally performs link switchover, although with delay and packet loss.

PORT (PIM Over Reliable Transport) multicast routing protocol proposes sending join/prune messages over a TCP (Transmission Control Protocol) connection, which can be shared among several interfaces. Routing elements that implement PORT (also referred to herein as PORT routing elements) send and accept PORT join/prune messages from one another, and also discard (native) PIM join/prune messages from one another. In response to receiving a join message that requests a particular datastream, the downstream PORT routing element also consults its routing information to select an interface that leads toward the content provider of the datastream. Although a PORT join/prune message includes much of the same information that a PIM join/prune message includes, a PORT join message also includes an interface identifier (ID) field that identifies the selected interface on which the downstream PORT routing element expects to receive the requested datastream. The PORT join message can be sent to the upstream PORT routing element via any interface coupled to the upstream PORT routing element that shares the TCP connection. In other words, the downstream PORT routing element also conventionally selects the forwarding interface for the requested datastream.

In the event of failure of the forwarding interface, the downstream PORT routing element similarly waits for its routing information to converge before trying to repair the multicast tree, or branch thereof. Once convergence is complete, the downstream PORT routing element selects another upstream interface toward the content provider and transmits a PORT join message that includes the interface ID of the selected interface, which will become the new forwarding interface for the datastream. Packet loss also occurs during this downtime (e.g., packets continue to be transmitted downstream on the failed forwarding interface) until the multicast tree is rebuilt and packets are forwarded on the new forwarding interface. This downtime occurs even if the downstream PORT routing element is coupled to the upstream PORT routing element via a second active link (such as an ECMP link), which is eventually selected as the new forwarding interface. In other words, the downstream PORT routing element also conventionally performs link switchover, although with delay and packet loss.

In order to avoid packet loss and delay that occurs during conventional link switchover (as described above), the present disclosure moves forwarding interface selection logic from a downstream PORT routing element to the upstream PORT routing element. In event of failure of the current forwarding interface of a multicast datastream, the upstream PORT routing element can perform link switchover by selecting a new forwarding interface for the datastream that also reaches the downstream PORT routing element. Since the downstream PORT routing element does not know which interface is selected as the forwarding interface until packets of the datastream are received, the downstream PORT routing element installs all interfaces that reach the upstream PORT routing element as candidate RPF (Reverse Path Forwarding) interfaces. When a packet of the datastream is received, downstream PORT routing element performs a modified RPF (Reverse Path Forwarding) check that determines whether the packet is properly received on one of the candidate RPF interfaces associated with the datastream. Thus, the present disclosure moves link switchover logic from a downstream PORT routing element to an upstream PORT routing element, which achieves faster switchover (e.g., Faster Re-Route speeds).

Figure 7:
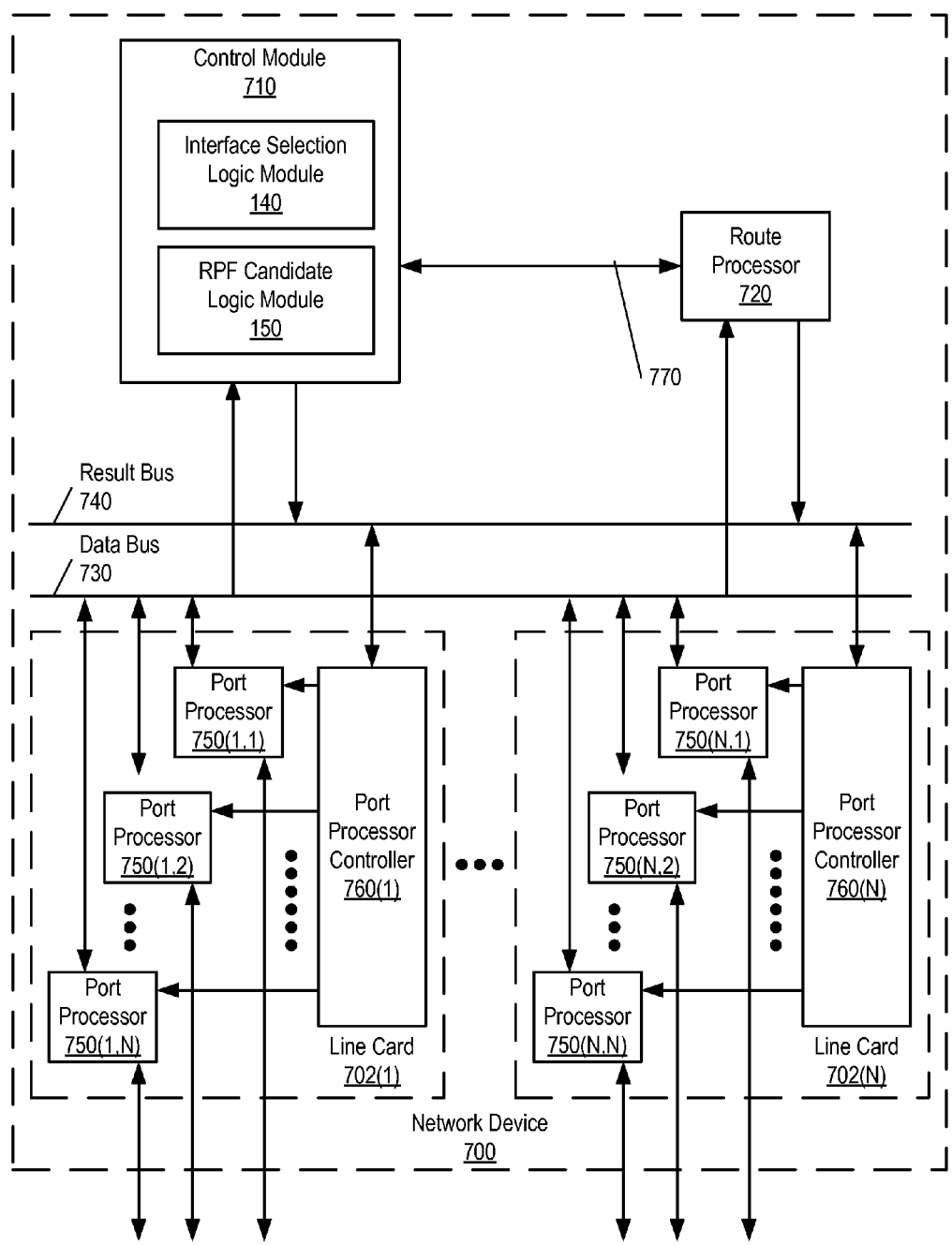
FIG. 7 is a block diagram illustrating components of an example network device in which the present disclosure can be implemented, according to one embodiment.
Figure 8:
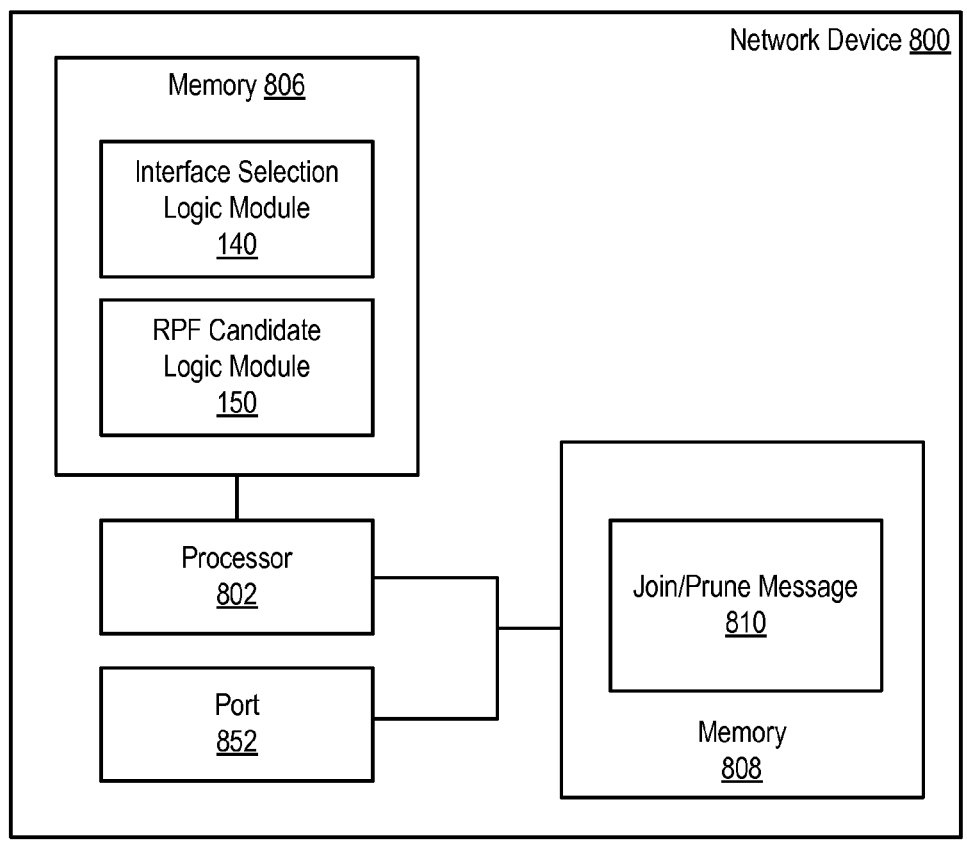
FIG. 8 is a block diagram illustrating components of an example network device in which the present disclosure can be implemented, according to one embodiment.

The present disclosure is implemented in an interface selection logic module 140 and an RPF (reverse path forwarding) candidate logic module 150, both of which are configured on each PORT routing element (illustrated in FIGS. 7 and 8). Interface selection logic module 140 is configured to implement (at least in part) operations performed by an upstream PORT routing element (e.g., performing forwarding interface selection and performing link switchover), and thus is displayed in FIG. 1 as implemented on upstream PORT routing element 135(1). RPF candidate logic module 150 is configured to implement (at least in part) operations performed by a downstream PORT routing element (e.g., performing candidate RPF interface installation and performing a modified RPF check), and thus is displayed in FIG. 1 as implemented on downstream PORT routing element 135(2). Interface selection logic module 140 and RPF candidate logic module 150 are further discussed below with reference to FIG. 2.

An example of network 105 is a local area network (LAN) utilizing Ethernet, IEEE 802.11x, or some other communications protocol. In light of the present disclosure, it will be appreciated that network 105 can include other components such as routers, firewalls and the like that are not germane to the discussion of the present disclosure and will not be discussed further herein. It will also be appreciated that other configurations are possible. For example, a much larger number of sources 110(1)-(N), receivers 120(1)-(N), routing elements 130(1)-(2), and/or PORT routing elements 135(1)-(2) than the number shown can be implemented in the network, and so on.

The letter N is used to indicate a variable number of devices or components. For example, a variable number of sources 110, routing elements 130 and 135, and receivers 120 are implemented in the network. Although the letter N is used in describing a variable number of instances of each of these different devices and components, a repeated use of the letter N does not necessarily indicate that each device and component has a same number of N instances implemented in the network.

Figure 2:
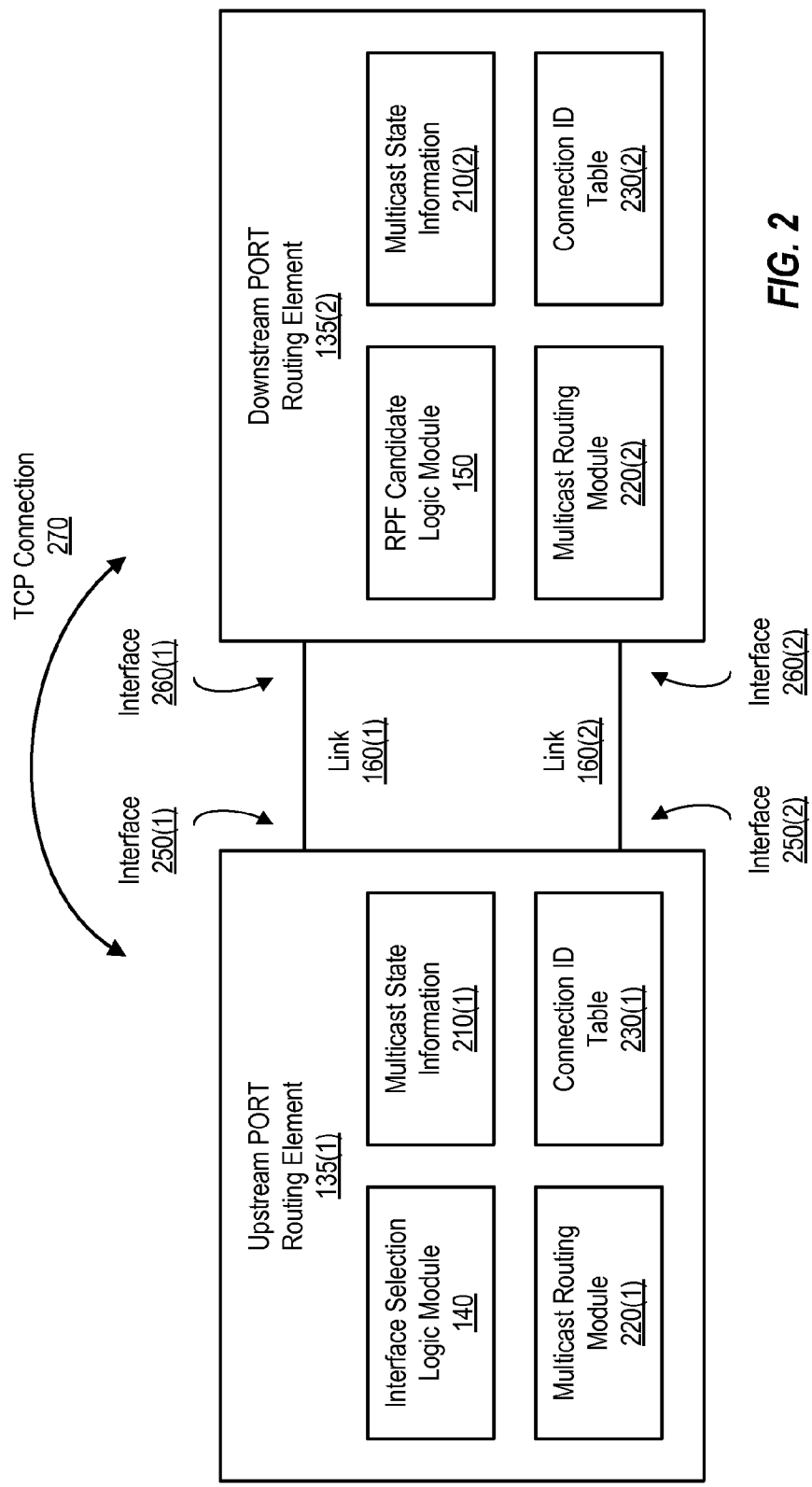
FIG. 2 is a block diagram illustrating components of example PORT routing elements in which the present disclosure can be implemented, according to one embodiment.

FIG. 2 is a block diagram illustrating components of example PORT routing elements in which the present disclosure can be implemented. PORT routing elements 135(1) and (2) are also referred to herein as a PORT routing element, PORT router, and PORT-enabled routing element. Upstream PORT routing element 135(1) is configured with interface selection logic module 140, multicast state information 210 (1), multicast routing module 220(1), and connection ID (identifier) table 230(1). Downstream PORT routing element 135(2) is configured with RPF candidate logic module 150, multicast state information 210(2), multicast routing module 220(2), and connection ID table 230(2). These components are further discussed below.

In the embodiment illustrated, upstream PORT routing element 135(1) is coupled to downstream PORT routing element 135(2) via two links 160(1) and 160(2), but more than two links can be implemented between PORT routing elements 135(1) and 135(2). In one embodiment, links 160(1) and 160(2) can be equal-cost multi-path (ECMP) links. Links 160(1) and 160(2) provide link redundancy between upstream and downstream PORT routing elements 135(1) and 135(2), where the links can each be assigned a cost metric, such as measure of delay or throughput. In one embodiment, the cost metric values of links 160(1) and 160 (2) are equal. Links 160(1) and 160(2) are respectively coupled to upstream PORT routing element 135(1) via interfaces 250(1) and 250(2), and are also respectively coupled to downstream PORT routing element 135(2) via interfaces 260 (1) and 260(2).

Multicast routing modules 220(1) and (2) implement PORT protocol (as well as PIM protocol) and are each responsible for generating any protocol messages (e.g., PORT/PIM hellos and join/prune messages). Multicast routing modules 220(1) and (2) also respectively maintain multicast state information 210(1) and (2), which describe the multicast states of various multicast datastreams being received and forwarded at a respective PORT routing element. Multicast state information 210 can be stored across one or more routing and/or forwarding tables configured on a PORT routing element.

A PORT routing element announces that it is PORT-enabled by sending PORT hello messages on every interface of the PORT routing element to neighboring routing elements. A PORT hello message includes a connection identifier (connection ID) and an interface identifier (interface ID) that uniquely identifies the interface on which the PORT hello is sent. When two neighboring routing elements (e.g., next-hop routing elements) such as PORT routing elements 135(1) and (2) discover they are both PORT-enabled, the pair of neighboring PORT routing elements establish a TCP connection, according to PORT negotiation of the TCP connection. Only one TCP connection is established between the pair of neighboring PORT routing elements (e.g., either on link 160(1) or on link 160(2)), regardless of the number of links directly coupling the neighboring PORT routing elements. The TCP connection is uniquely identified by a connection ID (e.g., one of the connection IDs included in the exchanged PORT hello messages, according to PORT negotiation of the TCP connection). The established TCP connection is shared among the links coupling the neighboring PORT routing elements through use of the interface ID.

Once the TCP connection (e.g., TCP connection 270) is established between a pair of neighboring PORT routing elements, each multicast routing module 220 of the pair stores the connection ID of the TCP connection in a respective connection ID table 230. Each multicast routing module 220 also stores the interface IDs of the interfaces that couple the pair of neighboring PORT routing elements (e.g., the interface IDs included in the PORT hello messages received from the neighboring PORT routing element) in the connection ID table with the connection ID of the associated TCP connection. In the embodiment illustrated, the connection ID of TCP connection 270 and multiple interface IDs associated with links 160(1) and (2) are stored in a same entry, which is stored in both connection ID tables 230(1) and (2). Thus, a set of interfaces that reach a neighboring PORT routing element (also referred to herein as a set of candidate interfaces) can be identified in connection ID table 230 using the connection ID of the neighboring PORT routing element.

Connection ID table 230 maintains a list of (active) interfaces that lead to a neighboring PORT routing element (as indicated by the interfaces being associated with the connection ID of the neighboring PORT routing element), based on received PORT hello messages. Each connection ID table entry for an interface has an expiry time that indicates when an entry should be removed (e.g., on expiration of the expiry time), which is reset each time a PORT hello is received on the interface (e.g., if no PORT hellos have been received on a given interface for a timeout period, the interface is no longer active and should be removed from the connection ID table). Since upstream PORT routing element 135(1) knows which (working) interfaces lead to downstream PORT routing element 135(2) (because those interfaces are stored in connection ID table 230(2) and are identifiable by connection ID), upstream PORT routing element 135(1) can perform link switchover.

Conventionally, in response to receiving a join message (which can be a PIM or a PORT join message) that identifies a datastream, a downstream PORT routing element selects a forwarding interface for the datastream (as discussed above). In the present disclosure, the upstream PORT routing element selects an interface from a set of interfaces that couple the upstream and downstream PORT routing elements and that share the TCP connection. The upstream PORT routing element also installs the selected interface as the forwarding interface for the datastream. Logic for selecting and installing a forwarding interface is implemented (in cooperation with multicast routing module 220(1)) by an interface selection logic module 140 configured on an upstream PORT routing element 135(1). In the event that the current forwarding interface of the datastream fails, the upstream PORT routing element can select and install another interface that reaches the downstream PORT routing element to perform link switchover. Link switchover logic is also implemented by interface selection module 140 (in cooperation with multicast routing module 220(1)).

Since the downstream PORT routing element does not know which interface is selected as the forwarding interface until packets of the datastream are received, the downstream PORT routing element installs all interfaces that are coupled to the upstream PORT routing element and share the TCP connection as candidate RPF (Reverse Path Forwarding) interfaces. Logic for installing candidate RPF interfaces is implemented by an RPF candidate logic module 150 configured on a downstream PORT routing element 135(2). When a packet of the datastream is received, downstream PORT routing element performs a modified RPF check to determine whether the packet is properly received on one of the candidate RPF interfaces associated with the datastream. Modified RPF check logic is also implemented by RPF candidate logic module 150 (in cooperation with multicast routing module 220(2)).

Also, in response to receiving the join message, the downstream PORT routing element sends a special PORT join message to upstream PORT routing element to inform the upstream PORT routing element that it should select and install a forwarding interface for the datastream. Similarly, if a prune message for the datastream is subsequently received at the downstream PORT routing element, the downstream PORT routing element sends a special PORT prune message to upstream PORT routing element to inform the upstream PORT routing element that the forwarding interface should be uninstalled. RPF candidate logic module 150 also implements (in cooperation with multicast routing module 220(2)) logic for generating and transmitting a special PORT join/prune message to upstream PORT routing element 135(1). Interface selection logic module 140 also implements (in cooperation with multicast routing module 220(1)) logic for processing a special PORT join/prune message received from downstream PORT routing element 135(2).

Figure 3:
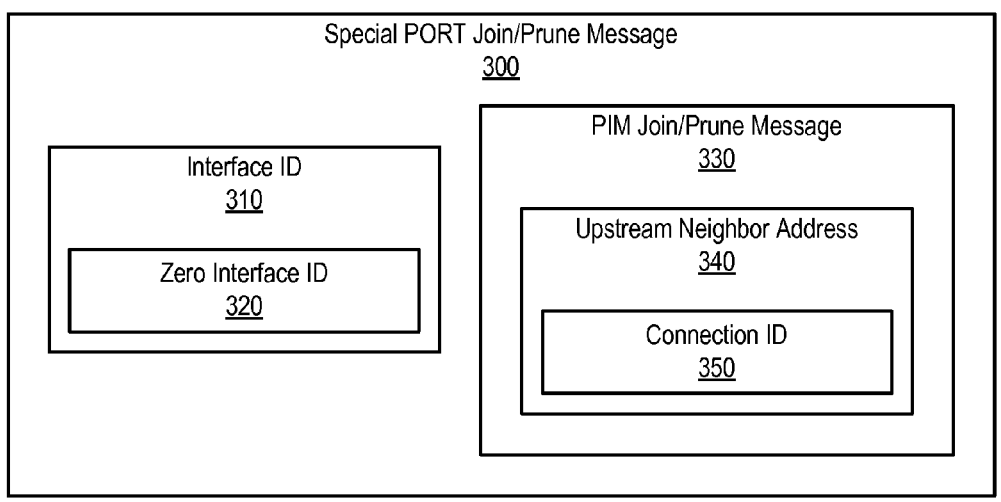
FIG. 3 is a block diagram illustrating an example format of an example special PORT join/prune message, according to one embodiment.

FIG. 3 is a block diagram illustrating an example format of a special PORT join/prune message 300. A special PORT join/prune message is basically a modified PORT join/prune message. Special PORT join/prune message 300 includes a PIM join/prune message 330, which in turn includes a field 340 that conventionally includes the address of the upstream neighbor (PORT) routing element. Special PORT join/prune message 300 instead includes a connection ID 350 associated with the upstream PORT routing element in the upstream PORT routing element address field 340. Special PORT join/prune message 300 also includes an interface ID field 310, which conventionally identifies the interface on which the downstream PORT routing element expects to receive the requested datastream (e.g., the forwarding interface). Special PORT join/prune message 300 instead includes an interface ID of all zeros, also referred to herein as a zero interface ID 320, in the interface ID field 310 to indicate that the upstream PORT routing element should select the forwarding interface.

RPF candidate logic module 150 is configured to trigger multicast routing module 220(2) on a downstream PORT routing element 135(2) to generate a special PORT join/prune message. In one embodiment, multicast routing module 220(2) can generate a normal PORT join/prune message and can modify the normal message to produce a special PORT join/prune message, according to RPF candidate logic module 150's instruction. RPF candidate logic module 150 determines the connection ID associated with the upstream PORT routing element and instructs multicast routing module 220(2) to place the connection ID in upstream neighbor address field 340 of the special PORT join/prune message. RPF candidate logic module 150 also instructs multicast routing module 220(2) to place the zero interface ID in the interface ID field 310 of the special PORT join/prune message. In another embodiment, RPF candidate logic module 150 can itself modify the normal PORT join/prune message (generated by multicast routing module 220(2)) into a special PORT join/prune message by overwriting the address field 340 with the connection ID and overwrite the interface ID field 310 with the zero interface ID.

Forwarding Interface Selection

Returning to FIG. 2, a join message requesting a datastream (which can be a PIM or a PORT join message) is received at downstream PORT routing element 135(2). In response, multicast routing module 220(2) configured on downstream PORT routing element 135(2) consults downstream PORT routing element's routing information and determines the upstream interface toward the content provider of the datastream, also referred to as the RPF (reverse path forwarding) interface. Once the RPF interface has been determined, RPF candidate logic module 150 determines whether the RPF interface is coupled to a PORT-enabled upstream routing element (e.g., whether the upstream routing element has announced its PORT status via PORT hello messages). If the upstream routing element is PORT-enabled, RPF candidate logic module 150 is configured to determine the connection ID of the TCP connection to the upstream PORT routing element using the RPF interface. For example, a lookup performed in connection ID table 130(2) using the interface ID of the RPF interface returns the associated connection ID that identifies the TPC connection to upstream PORT routing element 135(1).

RPF candidate logic module 150 cooperates with multicast routing module 220(2) to generate a special PORT join message (instead of a normal PORT join message). The special PORT join message includes a zero interface ID that indicates to upstream PORT routing element 135(1) that the upstream PORT routing element should select the forwarding interface for the datastream identified in the special PORT join message. The special PORT join message also includes the connection ID of the TCP connection to the upstream PORT routing element. The special PORT join message is transmitted on one of the interfaces coupled to the upstream PORT routing element that share the connection ID returned by the lookup in the connection ID table 130(2).

In response to receipt of a special PORT join message, interface selection logic module 140 detects the special PORT join message includes a zero interface ID. In response to detecting the zero interface ID, interface selection logic module 140 is configured to perform a lookup in connection ID table 230(1) using the connection ID extracted from the special PORT join message. The lookup identifies a set of candidate interfaces that are associated with the connection ID (and thus are interfaces that will reach downstream PORT routing element 135(2)). Interface selection logic module 140 is configured to select one of the set of candidate interfaces that are associated with the connection ID, based on a selection policy. In one embodiment, the selection policy of interface selection logic module 140 can be a round robin selection policy (sequentially selecting an interface from the set of candidate interfaces), a weighted selection policy (each interface is given a weighted value, which is used to select an interface), or any other selection policy that defines how interfaces should be selected (e.g., interface selection is a local matter).

Once an interface is selected, interface selection logic module 140 is configured to install the selected interface as a forwarding interface for the requested datastream by cooperating with multicast routing module 220(1) to update multicast state information 210(1) with the selected interface. For example, an incoming interface on which the datastream is received and a list of outgoing interfaces on which the datastream is forwarded is stored in an entry of multicast state information 230 that represents the requested datastream. Interface selection logic module 140 is configured to inform multicast routing module 220(1) to add the selected interface to an outgoing interface list associated with the requested multicast datastream. Packets of the datastream are forwarded to downstream PORT routing element via the selected (or forwarding) interface.

Similarly, a prune message identifying a datastream is subsequently received at downstream PORT routing element 135(1). In response, multicast routing module 220(2) consults routing information and determines the RPF interface.

RPF candidate logic module 150 then determines whether the RPF interface is coupled to a PORT-enabled upstream routing element. If the upstream routing element is PORT-enabled, RPF candidate logic module 150 is configured to determine the connection ID of the TCP connection to the upstream PORT routing element, using the RPF interface. RPF candidate logic module 150 cooperates with multicast routing module 220(2) to generate a special PORT prune message that includes a zero interface ID that indicates to the upstream PORT routing element that the upstream PORT routing element previously performed forwarding interface selection for this datastream, and should now uninstall the forwarding interface (e.g., the datastream should no longer be forwarded on the forwarding interface). The special PORT prune message also includes the connection ID of the TCP connection to the upstream PORT routing element. The special PORT prune message is transmitted on one of the interfaces coupled to the upstream PORT routing element that share the connection ID.

In response to receiving a special PORT prune message, interface selection logic module 140 detects the special PORT prune message includes a zero interface ID. In response to detecting the zero interface ID, interface selection logic module 140 is configured to uninstall the forwarding interface by cooperating with multicast routing module 220(1) to update multicast state information 210(1). To do this, interface selection logic module 140 is configured to perform a lookup in connection ID table 230(1) using the connection ID extracted from the special PORT prune message. The lookup identifies a set of candidate interfaces that are associated with the connection ID. Interface selection logic module 140 is configured to inform multicast routing module 220(1) to remove the forwarding interface that is associated with the connection ID from the outgoing interface list of the multicast datastream (e.g., remove the interface ID that matches one of the interface IDs included in the set of candidate interfaces associated with the connection ID).

Modified RPF Check

Since upstream PORT routing element 135(1) selects the forwarding interface from a number of candidate interfaces that reach (e.g., are directly coupled to) downstream PORT routing element 135(2), the forwarding interface is unknown to downstream PORT routing element 135(2) until the multicast datastream packets are received on one of the interfaces coupled to upstream PORT routing element 135(2). If the receiving interface is different from the RPF interface selected by downstream PORT routing element 135(2) (e.g., a default or a "guessed" RPF interface is stored in multicast state information 210(2) for the requested multicast datastream), the datastream packets would be discarded, even though the packets are being correctly received. In order to solve this problem, when sending a special PORT join message to upstream PORT routing element, RPF candidate logic module 150 is also configured to install all interfaces directly coupled to the upstream PORT routing element that are associated with the same connection ID as candidate RPF interfaces for the requested multicast datastream. RPF candidate logic module 150 triggers multicast routing module 220(2) to update multicast state information 220(2) with the interfaces. Thus, packets received from the upstream PORT routing element on any of the candidate RPF interfaces will be accepted.

In one embodiment, RPF candidate logic module 150 is configured to inform multicast routing module 220(2) to install the candidate RPF interfaces by modifying the (conventionally singular) incoming interface associated with the multicast datastream to include a list of incoming interfaces that would include the RPF interface candidates. In such an embodiment, RPF candidate logic module 150 performs an RPF check on a received packet of the multicast datastream to verify that the interface on which the packet is received is included in the list of incoming interfaces of the multicast datastream (e.g., the interface ID of the receiving interface matches an interface ID included in the list of incoming interfaces).

In another embodiment, RPF candidate logic module 150 is configured to inform multicast routing module 220(2) to install the RPF interface candidates by associating the connection ID of upstream PORT routing element 135(1) with the multicast datastream (e.g., store the connection ID, rather than an incoming (RPF) interface, in multicast state information 210(2)). When a packet of the multicast datastream is received from the upstream PORT routing element in such an embodiment, RPF candidate logic module 150 performs a modified RPF check on the packet to verify that the interface on which the packet is received is associated with the connection ID that is associated with the multicast datastream in multicast state information 210(2).

Similarly, when sending a special PORT prune message to upstream PORT routing element, RPF candidate logic module 150 is also configured to cooperate with multicast routing module 220(2) to uninstall the candidate RPF interfaces associated with the connection ID by updating multicast state information 210(2). In one embodiment, RPF candidate logic module 150 is configured to inform multicast routing module 220(2) to remove the list of candidate RPF interfaces from a list of incoming interfaces associated with the multicast datastream. In another embodiment, RPF candidate logic module 150 is configured to inform multicast routing module 220(2) to remove the association between the connection ID and the multicast datastream (e.g., remove the connection ID from multicast state information 210(2)).

Link Switchover

In response to detection of a failure of the present forwarding interface for a multicast datastream, interface selection logic module 140 is configured to switch over from the failed interface (that reaches the downstream PORT router) to another interface that also reaches the downstream PORT routing element. To do so, interface selection logic module 140 is configured to perform a lookup in connection table 230(1) using the interface ID of the failed interface. The lookup identifies the associated connection ID of the downstream PORT routing element. The lookup also identifies other interfaces associated with the same connection ID, which are a set of candidate interfaces that reach the same downstream PORT routing element. Interface selection module 140 is configured to select an interface from the set of candidate interfaces as a replacement forwarding interface for the datastream. Interface selection logic module 140 can perform the selection based on a selection policy, such as a round robin selection policy, a weighted selection policy, or other selection policy. A selection policy for switchover (e.g., selecting a replacement forwarding interface in response to failure of the present forwarding interface) can be the same or different from a selection policy for selecting a forwarding interface in response to receipt of a special PORT join message.

Once an interface is selected from the set of candidate interfaces, interface selection logic module 140 is configured to immediately perform link switchover to the selected interface by cooperating with multicast routing module 220(1) to update multicast state information 210(1). To do so, interface selection logic module 140 is configured to inform multicast routing module 220(1) to install the selected interface as the (new) forwarding interface for the datastream. In other words, the selected interface replaces the failed interface in the outgoing interface list associated with the multicast datastream (e.g., the interface ID of the failed interface is overwritten with the interface ID of the selected interface in the outgoing interface list). Downstream PORT routing element 135(2) will accept the multicast datastream packets received on the new forwarding interface, as long as the new forwarding interface is associated with the (same) connection ID associated with the previous interface (e.g., the connection ID to upstream PORT routing element 135(1)).

Since the upstream PORT routing element knows in advance which downstream interfaces are available, the upstream PORT routing element can establish a backup forwarding interface for a primary forwarding interface. The interface IDs of the primary forwarding interface and the backup forwarding interface can be loaded into a multicast forwarding information base or MFIB (which stores multicast state information 210) on a line card of the upstream routing element, where both the primary and backup forwarding interfaces are coupled to one or more line cards of the upstream routing element. As soon as the primary forwarding interface fails, the line card can immediately switch to the backup interface without involving PIM or depending on any signaling from the upstream PORT routing element's route processor (e.g., the line card performs switchover in response to the failure, without waiting to receive updated routing information from the route processor, which keeps the MFIB up to date) to the line card. Such a scenario can provide switchover in less than 50 ms, and significantly reduce packet loss.

If no downstream interfaces that reach the downstream PORT routing element are available (e.g., no active interfaces are available), the normal process for re-establishing the multicast tree, or a branch thereof, occurs (e.g., downstream PORT routing element waits for convergence before computing a new route and sends a PIM join message to a new upstream routing element).

Figure 4A:
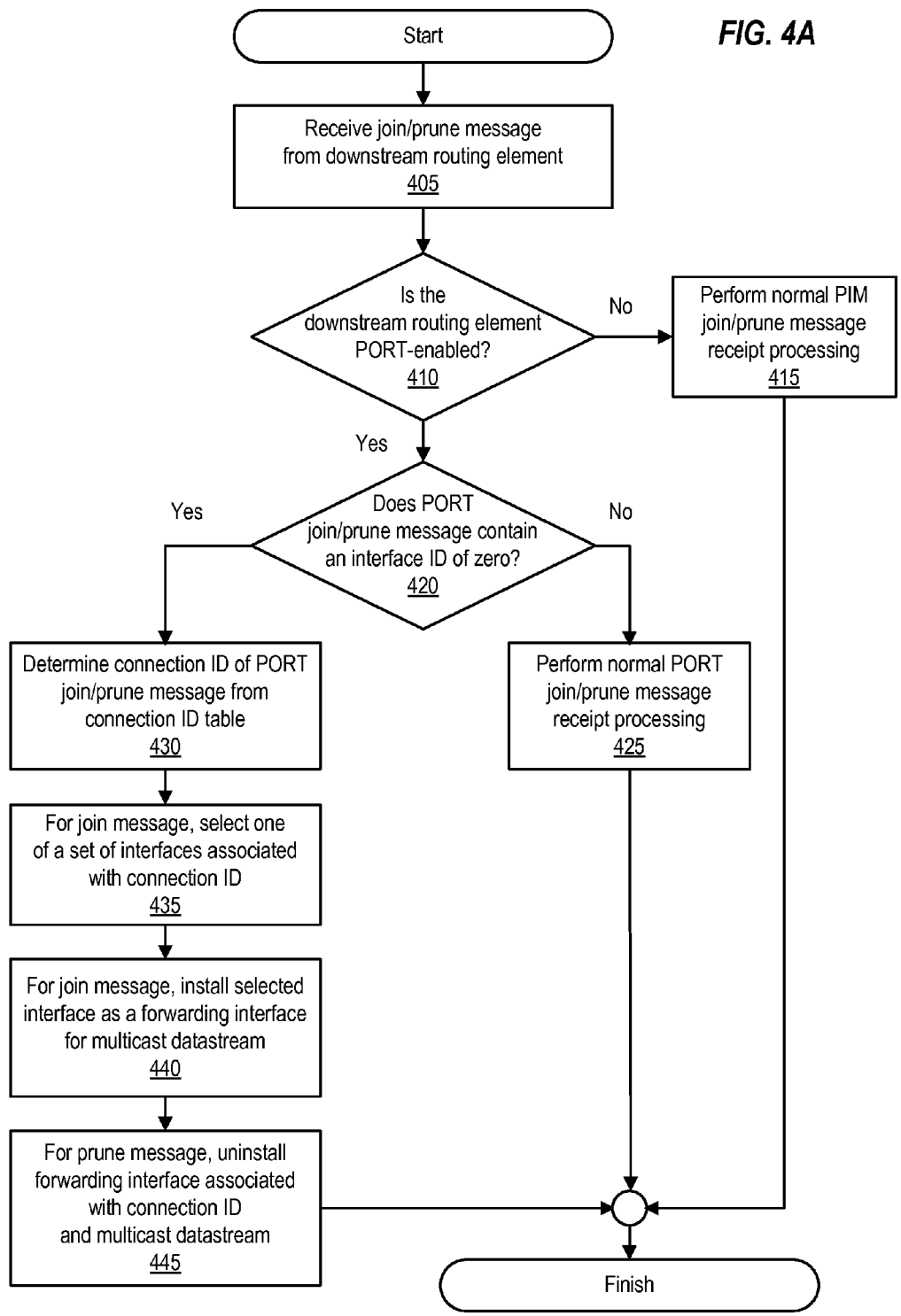
FIG. 4A is a flowchart illustrating acts of an example join/prune message receipt process implemented by an upstream PORT routing element, according to one embodiment.

FIG. 4A is a flowchart illustrating acts of an example join/prune message receipt process cooperatively implemented by an interface selection logic module and a multicast routing module configured on an upstream PORT routing element. The process can be implemented each time a join/prune message is received.

The process begins at operation 405, where a join/prune message (e.g., a PORT join/prune message or a PIM join/prune message) is received at an upstream PORT routing element from a downstream routing element. The join/prune message, or information extracted from the join/prune message, can be transferred internally to a multicast routing module. The process continues to operation 410, where the multicast routing module determines whether the downstream routing element is PORT-enabled. If the downstream routing element is not PORT-enabled (e.g., is a PIM routing element), the process continues to operation 415, where the multicast routing module performs normal PIM join/prune message receipt processing, and the process ends.

Returning to operation 410, if the downstream routing element is PORT-enabled, the process continues to operation 420, where the interface selection logic module determines whether the PORT join/prune message contains an interface ID of zero. If the PORT join/prune message does not contain an interface of zero (e.g., is a conventional PORT join/prune message), the process continues to operation 425, where the multicast routing module performs normal PORT join/prune message receipt processing, and the process ends.

Returning to operation 420, in response to a determination that the PORT join/prune message contains an interface ID of zero, the process continues to operation 430, where the interface selection logic module extracts the connection ID included in the (special) PORT join/prune message and performs a lookup of the connection ID in a connection ID table. The lookup identifies a set of candidate interfaces associated with the connection ID.

Operation 430 begins special PORT join/prune message receipt processing. If the PORT join/prune message received in operation 405 is a special PORT join message, the process continues from operation 430 to operation 435, where the interface selection logic module selects one of the set of candidate interfaces associated with the connection ID of the PORT join message. The process continues to operation 440, where interface selection logic module (cooperatively with the multicast routing module) installs the selected interface as a forwarding interface for the multicast datastream requested by the PORT join message. For example, the selected interface is added to an outgoing interface list associated with the requested multicast datastream. The process skips operation 445 (which performs special PORT prune message receipt processing) and then ends.

Returning to operation 430, if the PORT join/prune message received in operation 405 is a special PORT prune message, the process continues from operation 430 to operation 445, skipping operations 435 and 440 (which perform special PORT join message receipt processing). In operation 445, interface selection logic module (cooperatively with the multicast routing module) uninstalls a forwarding interface associated with the connection ID of the PORT prune message for the multicast datastream identified in the PORT prune message. For example, the forwarding interface is removed from an outgoing interface list associated with the identified multicast datastream. The process then ends.

Figure 4B:
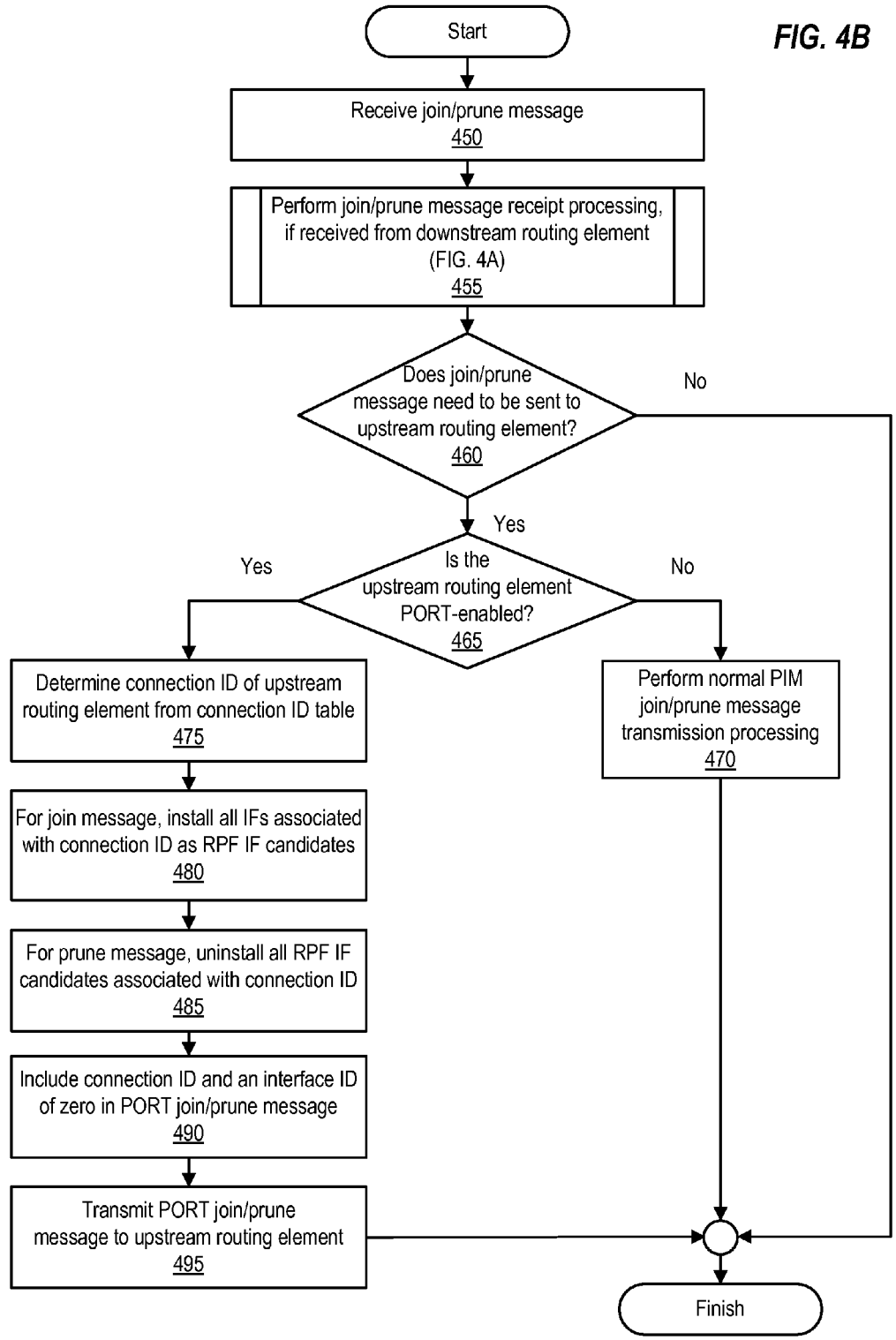
FIG. 4B is a flowchart illustrating acts of an example join/prune message transmission process implemented by a downstream PORT routing element, according to one embodiment.

FIG. 4B is a flowchart illustrating acts of an example join/prune message transmission process cooperatively implemented by an RPF candidate logic module and a multicast routing module configured on a downstream PORT routing element. The process can be implemented each time a join/prune message needs to be transmitted, such as in response to receipt of a first join/prune message (e.g., generate and transmit a new join/prune message in response to receiving an IGMP membership report from a receiver, or generate and transmit a join/prune message in response to receiving a PIM or PORT join/prune message from another routing element).

The process begins at operation 450, where a join/prune message is received at a (downstream) PORT routing element. The join/prune message can be received from a (further) downstream PORT routing element (e.g., a PORT join/prune message or PIM join/message) or from a receiver (e.g., an IGMP membership report).

The process continues to operation 455, where join/prune message receipt processing of FIG. 4A is performed, if the join/prune message is received from a downstream routing element (i.e., receipt processing of FIG. 4A is not performed for join/prune messages received from a receiver). The process then continues to operation 460 for all join/prune messages (e.g., received from both downstream routing elements and receivers).

In operation 460, a multicast routing module determines whether a join/prune message needs to be sent to an upstream routing element by consulting multicast state information. For example, multicast state information would indicate that the join/prune message should be propagated upstream to continue building or pruning a multicast tree for the datastream identified in the join/prune message received in operation 450. If the multicast routing module determines no join/prune message needs to be sent (according to normal PORT and PIM protocols), the process ends.

Returning to operation 460, if the multicast routing module determines that a join/prune message needs to be sent, the process continues to operation 465, where the multicast routing module is configured to consult routing information and determine an RPF interface toward the content provider of the datastream identified in the join/prune message received in operation 450. RPF candidate logic module is configured to determine whether the upstream routing element coupled to the RPF interface is PORT-enabled. In response to a determination that the upstream routing element is not PORT-enabled, the process continues to operation 470, where multicast routing module performs normal (e.g., conventional) PIM join/prune message transmission processing. The process then ends.

Returning to operation 465, in response to a determination that the upstream routing element is PORT-enabled, the process continues to operation 475, where the RPF candidate logic module determines the connection ID of the TCP connection to the upstream routing element. To do so, RPF candidate logic module performs a lookup in the connection ID table using the interface ID of the RPF interface. The lookup identifies a connection ID associated with the RPF interface and thus is also associated with the upstream routing element. The lookup also identifies other interface IDs associated with the same connection ID, also referred to as a set of candidate interfaces.

Operation 475 begins special PORT join/prune message transmission processing. If the join/prune message received in operation 450 is a special PORT join message, the process continues from operation 475 to operation 480, where RPF candidate logic module (cooperatively with the multicast routing module) installs all interfaces associated with the connection ID (e.g., the set of candidate interfaces found in the connection ID table) as RPF interface candidates for the requested multicast datastream. For example, the set of candidate interfaces are added to a list of incoming interfaces associated with the requested multicast datastream, or the connection ID is associated with the requested multicast datastream. The process skips operation 485 (which performs special PORT prune message transmission processing) and continues to operation 490.

Returning to operation 475, if the join/prune message received in operation 450 is a special PORT prune message, the process continues from operation 475 to operation 485, skipping operation 480 (which performs special PORT join message transmission processing). In operation 485, RPF candidate logic module (cooperatively with the multicast routing module) uninstalls all RPF interface candidates associated with the connection ID. For example, the set of candidate interfaces associated with the connection ID are removed from the list of incoming interfaces associated with the multicast datastream, or the association between the connection ID and multicast datastream is removed. The process continues to operation 490.

In operation 490, the multicast routing module generates a PORT join/prune message, and RPF candidate logic module includes the connection ID of the upstream PORT routing element and an interface ID of zero in the generated PORT join/prune message, thus producing a special PORT join/prune message. The process continues to operation 495, where routing module transmits the special PORT join/prune message to the upstream PORT routing element. The process then ends.

Figure 5:
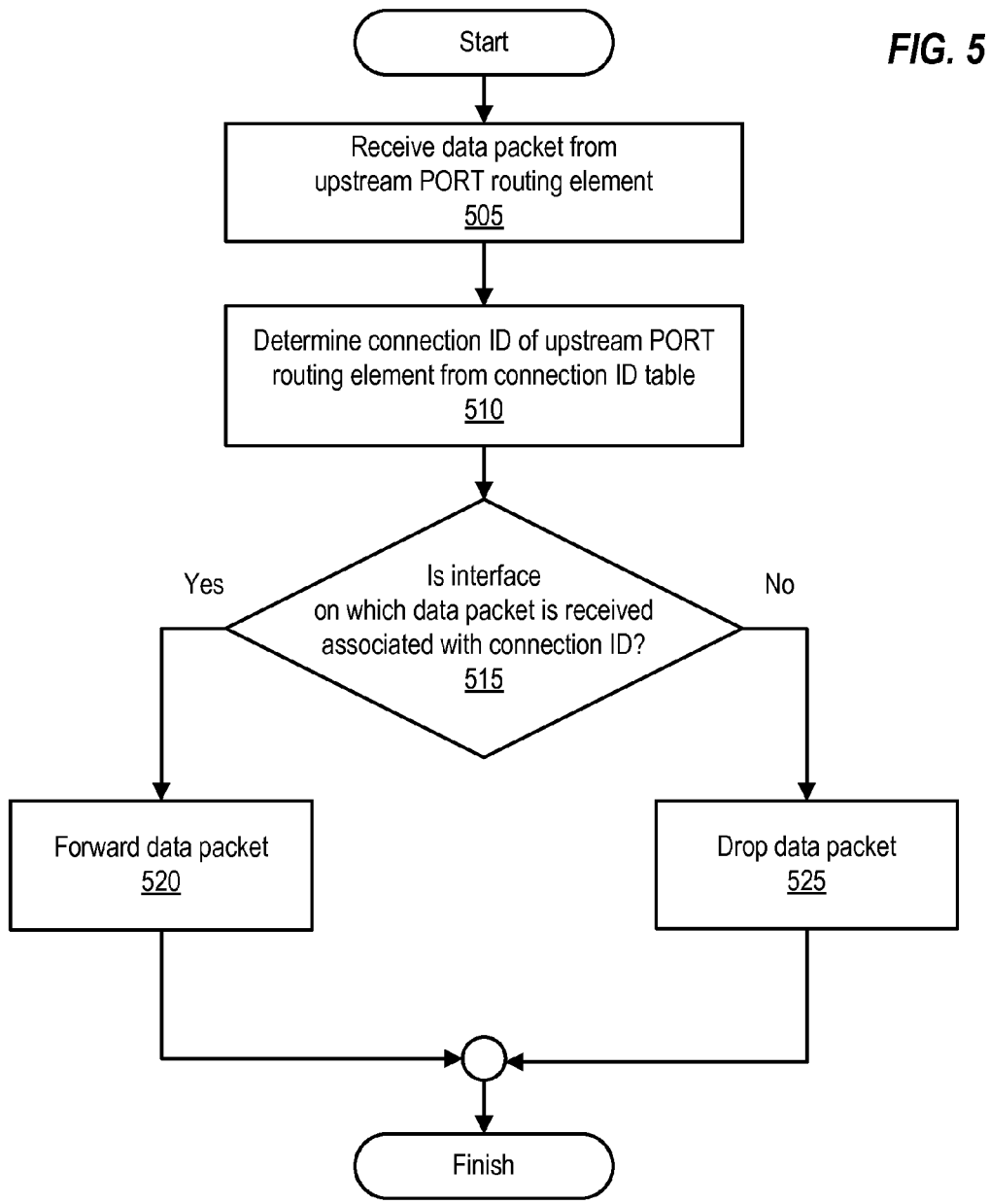
FIG. 5 is a flowchart illustrating acts of an example modified RPF check process implemented by a downstream PORT routing element, according to one embodiment.

FIG. 5 is a flowchart illustrating acts of an example modified RPF check process implemented by an RPF candidate logic module configured on a downstream PORT routing element. The process can be implemented each time a multicast datastream packet is received.

The process begins at operation 505, where a data packet is received from an upstream PORT routing element on an interface coupled to the downstream PORT routing element. Information in the packet can be transferred internally to the RPF candidate logic module. The process continues to operation 510, where RPF candidate logic module determines the connection ID of the connection to upstream PORT routing element. In one embodiment, a lookup is performed in the connection ID table using the interface on which the packet is received (e.g., the interface ID of the receiving interface). The lookup identifies an associated connection ID. The lookup also identifies a set of candidate interfaces associated with the (same) connection ID.

In another embodiment of operation 510, the RPF candidate logic module extracts multicast datastream information from the packet to determine the multicast datastream and performs a lookup of the multicast datastream in multicast state information. The lookup identifies a connection ID associated with the multicast datastream, and RPF candidate logic module performs a lookup of the connection ID in the connection ID table. This lookup identifies a set of candidate interfaces associated with the (same) connection ID.

The process continues to operation 515, where the RPF candidate logic module determines whether the interface on which the packet is received is also associated with the connection ID. In other words, the RPF candidate logic module determines whether the interface ID of the receiving interface matches one of the interface IDs of the set of candidate interfaces associated with the (same) connection ID. If the receiving interface is not associated with the connection ID (e.g., the packet is received on an interface that is not associated with the connection ID of the upstream PORT routing element), the packet fails the modified RPF check and, in response, is dropped. The process then ends. Returning to operation 515, if the receiving interface is associated with the connection ID, the process continues to operation 520, where the packet passes the modified RPF check and, in response, is forwarded. The process then ends.

An alternative operation 515 can include determining whether the interface on which the packet is received is included in an incoming interface list associated with the multicast datastream. Such an alternative operation 515 would occur in an embodiment where the incoming interface of multicast state information is modified to include a list of incoming interfaces. The RPF candidate logic module determines whether the receiving interface matches one of the interfaces included in the incoming interface list. If there is no match, the packet fails the RPF check and, in response, is dropped. If the receiving interface matches one of the interfaces, the packet passes the RPF check and, in response, packet is forwarded.

Figure 6:
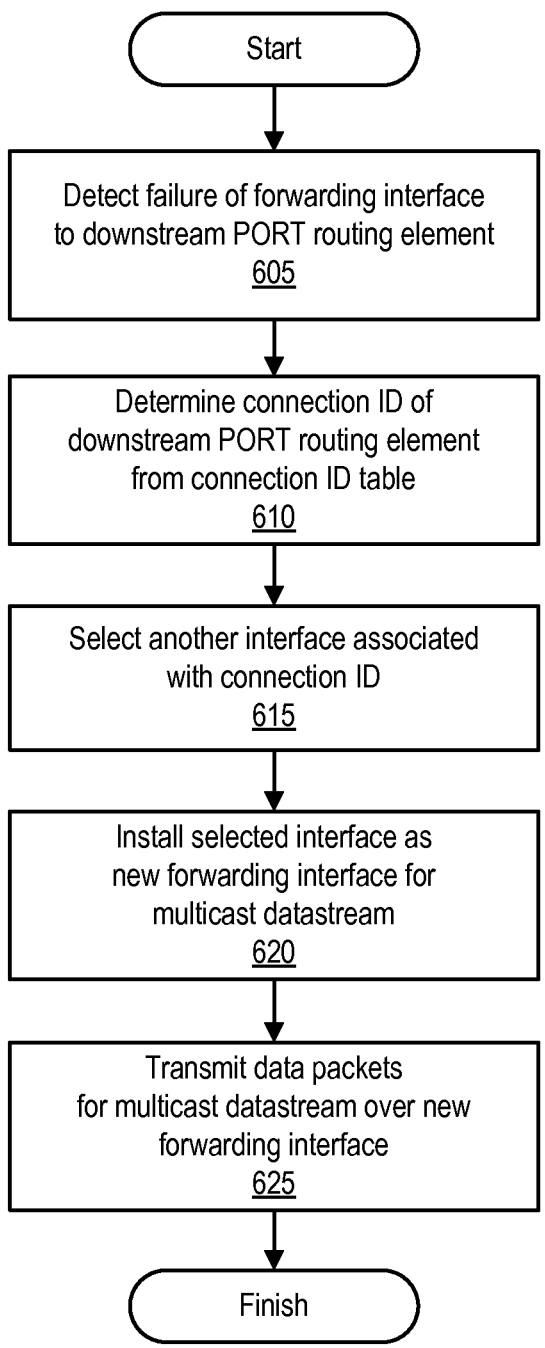
FIG. 6 is a flowchart illustrating acts of an example link switchover process implemented by an upstream PORT routing element, according to one embodiment.

FIG. 6 is a flowchart illustrating acts of an example link switchover process implemented by an interface selection routing element configured on an upstream PORT routing element. The process can be implemented each time an interface failure is detected.

The process begins at operation 605, where interface selection logic module detects failure of a present forwarding interface that is used to forward packets of a multicast datastream to a downstream PORT routing element. The process continues to operation 610, where the interface selection logic module determines the connection ID using the connection ID table. For example, the interface selection logic module can use the interface ID of the failed forwarding interface to perform a lookup in the connection ID table, which identifies an associated connection ID. Interface selection logic module can also use the connection ID to perform a lookup in connection ID table to identify a set of candidate interfaces also associated with the connection ID.

The process continues to operation 615, where interface selection logic module selects another interface associated with the connection ID (e.g., selects an interface from among the set of candidate interfaces). The process continues to operation 620, where interface selection logic (cooperatively with multicast routing module) installs the selected interface as the (new) forwarding interface for the multicast datastream. For example, interface selection logic module replaces the failed forwarding interface with the selected interface in multicast state information for the multicast datastream. The process continues to operation 625, where the upstream PORT routing element transmits data packets for the multicast datastream over the new forwarding interface. The process then ends.

FIG. 7 is a block diagram illustrating components of an example network device 700 configured as a routing device (e.g., PORT routing elements 135(1) and 135(2) of FIG. 1). In this depiction, network device 700 includes a number of line cards (line cards 702(1)-702(N)) that are communicatively coupled to a control module 710 (which can include a forwarding engine, not shown) and a route processor 720 via a data bus 730 and a result bus 740. Line cards 702(1)-(N) include a number of port processors 750(1,1)-750(N,N) which are controlled by port processor controllers 760(1)-760(N). It will also be noted that control module 710 and route processor 720 are not only coupled to one another via data bus 730 and result bus 740, but are also communicatively coupled to one another by a communications link 770. It is noted that in alternative embodiments, each line card can include its own forwarding engine.

When a message (e.g., an IGMP membership report, PIM join/prune message, or PORT join/prune message) is received (e.g., received from a receiver 120 or from network 105), the message is identified and analyzed by a network device such as network device 700 in the following manner. Upon receipt, a message (or some or all of its control information) is sent from one of the port processors 750(1,1)-750(N,N) at which the message was received (e.g., received from receiver 120) to one or more of those devices coupled to data bus 730 (e.g., others of port processors 750(1,1)-750(N,N), a forwarding engine, and/or route processor 720). Handling of the message can be determined, for example, by a forwarding engine. For example, a forwarding engine may determine that the message should be forwarded to one or more of port processors 750(1,1)-750(N,N). This can be accomplished by indicating to corresponding one(s) of port processor controllers 760(1)-760(N) that the copy of the message held in the given one(s) of port processors 750(1,1)-750(N,N) should be forwarded to the appropriate one of port processors 750(1,1)-750(N,N).

Network device 700 can implement interface selection logic module 140 and RPF candidate logic module 150 (e.g., in control module 710, as shown, or in one of port processor controllers 760(1)-760(N) and/or in route processor 720) in order to implement the present disclosure. Network device 700 can also implement multicast state information 210 (such as routing and/or forwarding tables, including a multicast forwarding information base), a multicast routing module 220, and a connection ID (identifier) table 230 (e.g., in control module 710, in one of port processor controllers 760(1)-760(N) and/or in route processor 720, not shown). An incoming message (e.g., a PIM join/prune message, a PORT join/prune message, or other join/prune message) can be provided to multicast routing module 220 via a forwarding engine or port processor of a line card coupled to a port that received the incoming message. Interface selection logic module 140 can communicate with multicast routing module 220 and can determine whether special PORT join/prune message receipt processing should be performed for the incoming message. Interface selection logic module 140 can also perform link switchover.

Multicast routing module 220 can also be configured to generate an outgoing message (e.g., a PIM join/prune message, PORT join/prune message, or other join/prune message) in response to the incoming message. RPF candidate logic module 150 can communicate with multicast routing module 220 and can determine whether special PORT join/prune message transmission processing should be performed for the outgoing message. Multicast routing module 220 can provide the outgoing message to a forwarding engine, which can determine that the outgoing message should be forwarded to one or more of port processors 750(1,1)-750(N,N), which can transmit the outgoing message (e.g., transmitted to network 105). RPF candidate logic module 150 can also perform a modified RPF check for multicast data packets received on an interface. Network device 700 can thus implement one or more of the methods illustrated in FIG. 3-6.

FIG. 8 is a block diagram illustrating components of an example network device 800, in which the network device is configured as a routing device (e.g., PORT routing elements 135(1) and 135(2) of FIG. 1). As illustrated, network device 800 includes one or more processors 802 (e.g., microprocessors, PLDs (Programmable Logic Devices), or ASICs (Application Specific Integrated Circuits)) configured to execute program instructions stored in memories 806 and/or 808, which are computer readable storage media. Memories 806 and 808 can include various types of RAM (Random Access Memory), ROM (Read Only Memory), Flash memory, MEMS (Micro Electro-Mechanical Systems) memory, and the like. Network device 800 also includes one or more ports 852 (e.g., one or more hardware ports or other network interfaces that can be linked to other network devices, hosts, servers, storage devices, or the like). Processor 802, port 852, and memories 806 and 808 are coupled to send and receive data and control signals by one or more buses or other interconnects.

In this example, program instructions executable to implement an interface selection logic module 140 and an RPF candidate logic module 150 are stored in memory 806. Multicast state information 210 and/or connection ID table 230 can also be stored in memory 806 and/or in memory 808. Program instructions executable to implement a multicast routing module 220 can also be stored in memory 806. Join/prune message 810 (e.g., an incoming join/prune message and/or an outgoing join/prune message) is stored in memory 808. Multicast routing module 220 includes the functionality needed to generate an outgoing join/prune message 810 (e.g., a PORT join/prune message, a PIM join/prune message, or other join/prune message). In one embodiment, join/prune message 810 can be generated by multicast routing module 220, and can be stored in memory 808 before being transmitted via port 852 (e.g., transmitted to network 105 coupled to port 852). Multicast routing module 220 also includes the functionality needed to process an incoming join/prune message 810 (e.g., a PORT join/prune message, a PIM join/prune message, or other join/prune message). In another embodiment, join/prune message 810 can be received from port 852 (e.g., received from another routing element or receiver coupled to port 852), and can be stored in memory 808 before being provided to multicast routing module 220 for processing.

Interface selection logic module 140 includes the functionality needed to perform special PORT join/prune message receipt processing, in response to an incoming join/prune message 810 that includes a zero interface ID (e.g., to perform the method illustrated in FIG. 3). RPF candidate logic module 150 includes the functionality needed to perform special PORT join/prune message transmission processing, in response to an outgoing join/prune message 810 that includes a zero interface ID (e.g., to perform the method illustrated in FIG. 4). RPF candidate logic module 150 also includes the functionality needed to perform a modified RPF check on a multicast data packet received on an interface (e.g., to perform the method illustrated in FIG. 5). Interface selection logic module 140 also includes the functionality needed to perform link switchover (e.g., to perform the method illustrated in FIG. 6).

Although the present disclosure has been described with respect to specific embodiments thereof, various changes and modifications may be suggested to one skilled in the art. It is intended such changes and modifications fall within the scope of the appended claims.

What is claimed is:

1. A method, comprising:
    transmitting a multicast datastream via a forwarding connection, wherein
        the forwarding connection is one of a plurality of connections between an upstream routing element and a downstream routing element, and
        each of the plurality of connections comprises a link and respective interfaces of the upstream and the downstream routing elements coupled to the link;
    detecting a failure of the forwarding connection;
    prior to the detecting the failure, determining a candidate connection from the plurality of connections between the upstream routing element and the downstream routing element, wherein
        the candidate connection is configured to replace the forwarding connection, and
        the candidate connection does not transmit the multicast datastream prior to the detecting the failure; and
    in response to the detecting, installing the candidate connection as a replacement forwarding connection for the transmitting the multicast datastream.

2. The method of claim 1, wherein the installing the candidate connection comprises
    replacing an interface ID (identifier) of a forwarding interface associated with the forwarding connection with a new interface ID of a new interface associated with the candidate connection in an outgoing interface list associated with the multicast datastream.

3. The method of claim 1, further comprising
    determining a set of candidate connections from the plurality of connections, before the detecting the failure of the forwarding connection;
    selecting the candidate connection from the set of candidate connections;
    installing the candidate connection as a backup forwarding connection for the transmitting the multicast datastream; and
    switching over to the backup forwarding connection, in response to the detecting the failure of the forwarding connection.

4. The method of claim 3, wherein the installing the candidate connection comprises
    loading an interface ID (identifier) associated with the candidate connection in a multicast forwarding information base (MFIB), wherein
        a candidate interface associated with the candidate connection is associated with the forwarding interface associated with the forwarding connection in the MFIB.

5. The method of claim 1, further comprising determining a set of candidate interfaces associated with the candidate connection, wherein the determining the set of candidate interfaces comprises
    determining a connection ID (identifier) associated with a forwarding interface associated with the forwarding connection; and
    identifying the set of candidate interfaces in a connection ID table, wherein
        the set of candidate interfaces is associated with the connection ID in an entry of the connection ID table.

6. The method of claim 5, wherein
    the connection ID identifies a TCP (Transmission Control Protocol) connection coupled to the downstream routing element.

7. The method of claim 1, further comprising:
    transmitting data packets of the multicast datastream over the replacement forwarding connection.

8. A non-transitory computer readable storage medium configured to store program instructions that, when executed on a processor, are configured to cause the processor to perform a method comprising:
    transmitting a multicast datastream via a forwarding connection, wherein
        the forwarding connection is one of a plurality of connections between an upstream routing element and a downstream routing element, and
        each of the plurality of connections comprises a link and respective interfaces of the upstream and the downstream routing elements coupled to the link;
    detecting a failure of the forwarding connection;
    prior to the detecting the failure, determining a candidate connection from the plurality of connections between the upstream routing element and the downstream routing element, wherein
        the candidate connection is configured to replace the forwarding connection, and
        the candidate connection does not transmit the multicast datastream prior to the detecting the failure; and
    in response to the detecting, installing the candidate connection as a replacement forwarding connection for the transmitting the multicast datastream.

9. The non-transitory computer readable storage medium of claim 8, wherein the installing the candidate connection comprises
    replacing an interface ID (identifier) of a forwarding interface associated with the forwarding connection with a new interface ID of a new interface associated with the candidate connection in an outgoing interface list associated with the multicast datastream.

10. The non-transitory computer readable storage medium of claim 8, the method further comprising
    determining a set of candidate connections from the plurality of connections, before the detecting the failure of the forwarding connection;
    selecting the candidate connection from the set of candidate connections;
    installing the candidate connection as a backup forwarding connection for the transmitting the multicast datastream; and
    switching over to the backup forwarding connection, in response to the detecting the failure of the forwarding connection.

11. The non-transitory computer readable storage medium of claim 10, wherein the installing the candidate connection comprises
loading an interface ID (identifier) associated with the candidate connection in a multicast forwarding information base (MFIB), wherein
a candidate interface associated with the candidate connection is associated with the forwarding interface associated with the forwarding connection in the MFIB.

12. The non-transitory computer readable storage medium of claim 8, the method further comprising:
determining a set of candidate interfaces associated with the candidate connection, wherein the determining the set of candidate interfaces comprises
determining a connection ID (identifier) associated with a forwarding interface associated with the forwarding connection; and
identifying the set of candidate interfaces in a connection ID table, wherein
the set of candidate interfaces is associated with the connection ID in an entry of the connection ID table.

13. The non-transitory computer readable storage medium of claim 12, wherein
the connection ID identifies a TCP (Transmission Control Protocol) connection coupled to the downstream routing element.

14. The non-transitory computer readable storage medium of claim 9, the method further comprising:
transmitting data packets of the multicast datastream over the replacement forwarding connection.

15. An apparatus, comprising:
a line card; and
a processor coupled to the line card, the processor configured to
transmit a multicast datastream via a forwarding connection, wherein
the forwarding connection is one of a plurality of connections between an upstream routing element and a downstream routing element,
detect a failure of the forwarding connection, wherein the forwarding connection is coupled to the line card,
determine a candidate connection from the plurality of connections between the upstream routing element and the downstream routing element, prior to detection of the failure, wherein
the candidate connection is configured to replace the forwarding connection, prior to detection of the failure, and
the candidate connection does not transmit the multicast datastream prior to detection of the failure, and
install the candidate connection as a replacement forwarding connection for the transmitting the multicast datastream, in response to detection of the failure.

16. The apparatus of claim 15, wherein the processor is further configured to
replace an interface ID (identifier) of a forwarding interface associated with the forwarding connection with a new interface ID of a new interface associated with the candidate connection in an outgoing interface list associated with the multicast datastream.

17. The apparatus of claim 15, wherein the processor is further configured to
determine a set of candidate connections from the plurality of connections, before the detecting the failure of the forwarding connection;
select the candidate connection from the set of candidate connections;
install the candidate connection as a backup forwarding connection for the transmitting the multicast datastream; and
switch over to the backup forwarding connection, in response to the detecting the failure of the forwarding connection.

18. The apparatus of claim 17, wherein the processor is further configured to
load an interface ID (identifier) associated with the candidate connection in a multicast forwarding information base (MFIB), wherein
a candidate interface associated with the candidate connection is associated with the forwarding interface associated with the forwarding connection in the MFIB.

19. The apparatus of claim 15, wherein the processor is further configured to
determine a set of candidate interfaces associated with the candidate connection, wherein the determining the set of candidate interfaces comprises
determine a connection ID (identifier) associated with a forwarding interface associated with the forwarding connection, wherein
the connection ID identifies a TCP (Transmission Control Protocol) connection coupled to the downstream routing element, and
identify the set of candidate interfaces in a connection ID table, wherein
the set of candidate interfaces is associated with the connection ID in an entry of the connection ID table.

20. The apparatus of claim 15, wherein the processor is further configured to
transmit data packets of the multicast datastream over the replacement forwarding connection.

21. The method of claim 1, wherein the forwarding connection fails as a result of a failure of the respective interface of the upstream routing element.

22. The method of claim 1, wherein the forwarding connection fails as a result of a failure of the respective interface of the downstream routing element.

23. The method of claim 1, wherein the forwarding connection fails as a result of a failure of the link.

* * * * *